United States Patent
Fujiura

(10) Patent No.: US 8,597,556 B2
(45) Date of Patent: Dec. 3, 2013

(54) METHOD FOR PRODUCING LONG FIBER REINFORCED THERMOPLASTIC RESIN PELLETS

(75) Inventor: Takayasu Fujiura, Kobe (JP)

(73) Assignee: Kabushiki Kaisha Kobe Seiko Sho, Kobe-shi, Hyogo (JP)

( * ) Notice: Subject to any disclaimer, the term of this patent is extended or adjusted under 35 U.S.C. 154(b) by 0 days.

(21) Appl. No.: 13/392,309

(22) PCT Filed: Sep. 17, 2010

(86) PCT No.: PCT/JP2010/066258
§ 371 (c)(1),
(2), (4) Date: Feb. 24, 2012

(87) PCT Pub. No.: WO2011/034187
PCT Pub. Date: Mar. 24, 2011

(65) Prior Publication Data
US 2012/0146253 A1    Jun. 14, 2012

(30) Foreign Application Priority Data
Sep. 18, 2009 (JP) .................................. 2009-217032

(51) Int. Cl.
*B29C 70/20* (2006.01)
(52) U.S. Cl.
USPC ........... 264/136; 264/134; 264/103; 264/339; 264/140; 264/141; 264/142; 264/143; 264/148; 264/151; 264/295
(58) Field of Classification Search
USPC ......... 264/295, 134, 136, 103, 339, 140, 141, 264/142, 143, 148, 151
See application file for complete search history.

(56) References Cited

U.S. PATENT DOCUMENTS

| | | | |
|---|---|---|---|
| 2010/0098946 A1 | 4/2010 | Tashiro et al. | |
| 2010/0230040 A1* | 9/2010 | Tashiro et al. | 156/244.19 |

FOREIGN PATENT DOCUMENTS

| | | |
|---|---|---|
| JP | 2000-084926 | 3/2000 |
| JP | 2007-038599 | 2/2007 |
| JP | 2008-221574 | 9/2008 |
| WO | WO2006/043620 | 4/2006 |
| WO | WO2007/018130 A1 | 2/2007 |
| WO | WO 2009/044641 | 4/2009 |

* cited by examiner

Primary Examiner — Timothy Kennedy
(74) Attorney, Agent, or Firm — Stites & Harbison PLLC; Juan Carlos A. Marquez, Esq.

(57) ABSTRACT

Disclosed is a method for producing long-fiber-reinforced thermoplastic resin pellets, comprising pultruding a plurality of reinforced fiber bundles in a molten thermoplastic resin while twisting the plurality reinforced fiber bundles to form a strand in which the reinforced fibers are coated with the thermoplastic resin, and cutting the strand to a predetermined length to form pellets, wherein the strand is pultruded under the conditions that the melt viscosity of the thermoplastic resin is adjusted such that the melt flow rate is 500 to 1500 g/10 min, and the twisting angle θ of the reinforced fiber bundles with respect to the pultruding direction of the strand is set as follows: 0°<θ≤50°. As a result of this configuration, according to the method for producing long-fiber-reinforced thermoplastic resin pellets, pellets in which reinforced fibers are easily untwisted when the pellets are melted so that the reinforced fibers can be uniformly dispersed in molded articles can be produced with high productivity.

6 Claims, 4 Drawing Sheets

$0° < \theta \leq 50°$ $50° < \theta$ $\theta = 0°$

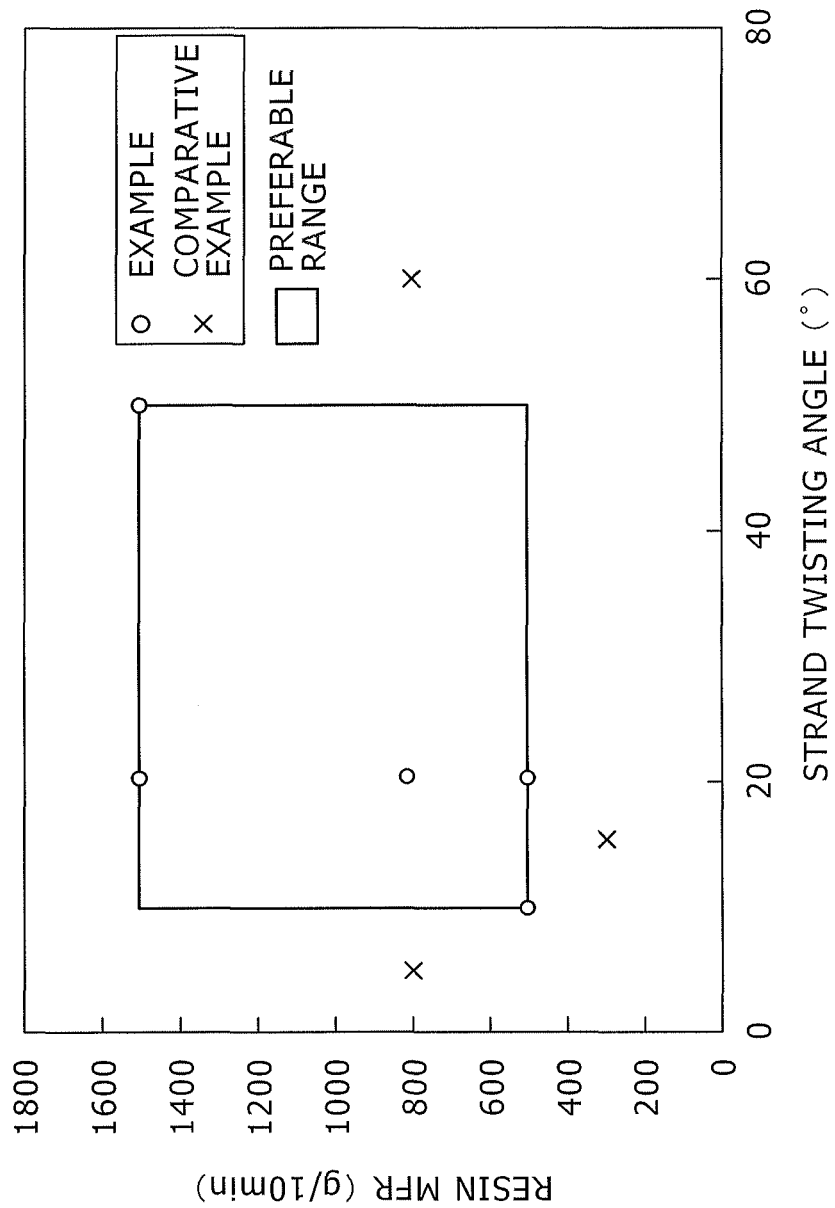

METHOD FOR PRODUCING LONG FIBER REINFORCED THERMOPLASTIC RESIN PELLETS

TECHNICAL FIELD

The present invention relates to a method for producing long fiber reinforced thermoplastic resin pellets.

BACKGROUND ART

A fiber reinforced thermoplastic resin (FRTP) is light and excellent in strength, and thus often used in an exterior of a vehicle, a vessel, and the like. Among the fiber reinforced thermoplastic resin, particularly a long fiber reinforced thermoplastic resin (LFRTP) containing reinforced fibers whose fiber length is long is excellent in shock resistance and rigidity, and thus frequently used in a bumper and a body of an automobile in recent years.

A molded article of such a long fiber reinforced thermoplastic resin is produced from a resin material formed by melting pellets, and the reinforced fibers whose fiber length is long are dispersed and distributed in the pellets. For example, Patent Document 1 discloses a method for producing pellets, including pultruding a plurality of reinforced fiber bundles such as glass rovings impregnated in a molten thermoplastic resin bath from the thermoplastic resin bath while twisting the reinforced fiber bundles to form a strand in which reinforced fibers are coated with a thermoplastic resin, and cutting the strand to a predetermined length to obtain the pellets.

In this method for producing the pellets, a pair of take-up rolls is arranged on the downstream side of the thermoplastic resin bath, and these rolls are arranged so as to be inclined in the directions different from each other with respect to the pultruding direction of the strand. Therefore, in the method for producing the pellets of Patent Document 1, by nipping the reinforced fiber bundles between these rolls, the strand in which the reinforced fiber bundles are twisted is produced as an intermediate body.

In the strand serving as the intermediate body pultruded in such a way, the reinforced fiber bundles are firmly tightened to each other due to twisting, and the reinforced fiber bundles are gathered on the center side of the strand. The reinforced fibers on the center side are coated with the thermoplastic resin so as to be surrounded. Therefore, when the strand is pultruded from a die, the thermoplastic resin plays a role of lubrication and helps pultruding of the strand, and the reinforced fibers are not brought into contact with the die and do not serve as resistance against the pultruding of the strand. As a result, the strand can be pultruded with smaller force than a conventional method for producing in which reinforced fiber bundles are pultruded in parallel. Since the resistance against the pultruding of the strand is small, there is an advantage that production speed of the pellets can be increased.

In the method of producing of Patent Document 1 in which production is performed with twisting, the reinforced fiber bundles are tightened due to the twisting, so that a volume thereof is reduced. Thus, there is also an advantage that a contained amount of the reinforced fibers can be easily increased, and hence a content rate of the reinforced fibers can be increased in comparison to the conventional method for producing in which the reinforced fibers are pultruded in parallel.

CITATION LIST

Patent Document

Patent Document 1: Japanese Unexamined Patent Application Publication No. 2008-221574

SUMMARY OF THE INVENTION

Problems to be Solved by the Invention

However, there is a tendency that the more melt viscosity of the thermoplastic resin coated over surfaces of the reinforced fibers is lowered, the less the thermoplastic resin penetrates an interior of the twisted reinforced fiber bundles. Therefore, when the thermoplastic resin having low melt viscosity is used, a part which is not impregnated with the thermoplastic resin is easily left in the interior of the reinforced fiber bundles. Thus, the part which is not impregnated with the thermoplastic resin is left in an interior of the strand or the pellets after cooling as a clearance. When the pellets are melted, bubbles are easily generated in a master batch. As a result, when the thermoplastic resin having low melt viscosity is used, there is a problem that a defect in an outer appearance is easily caused in the molded article.

In the method in which the reinforced fiber bundles are twisted, when pultruding speed of the strand is increased, the reinforced fibers are sometimes firmly tightened in the interior of the strand. Such firmly tightened reinforced fibers are not easily untwisted even when the pellets are melted. Thus, there is also a problem that the reinforced fibers are not properly dispersed in the molded article, and hence a mechanical property of the molded article is deteriorated.

The present invention is achieved in consideration of the above problems, and an object thereof is to provide a method for producing long fiber reinforced thermoplastic resin pellets, the method being capable of producing the pellets containing reinforced fibers at a high content rate with high productivity, and also capable of easily untwisting the reinforced fibers at the time of melting the pellets to uniformly disperse the reinforced fibers in a molded article without deteriorating a mechanical property and an outer appearance of the molded article.

Means for Solving the Problems

In order to achieve the above object, the present invention has the following technical means.

That is, a method for producing long fiber reinforced thermoplastic resin pellets of the present invention is a method for producing long fiber reinforced thermoplastic resin pellets, including pultruding a plurality of reinforced fiber bundles impregnated in a molten thermoplastic resin bath from the thermoplastic resin bath while twisting the reinforced fiber bundles to form a strand in which reinforced fibers are coated with the thermoplastic resin, and cutting the strand to a predetermined length to obtain the pellets, wherein the strand is pultruded under conditions that the a melt flow rate of thermoplastic resin is adjusted to 500 to 1,500 g/10 min, and a twisting angle $\theta$ of the reinforced fiber bundles with respect to the pultruding direction of the strand is set to $0° < \theta \leq 50°$.

It should be noted that a long fiber reinforced thermoplastic resin is a longer resin among the reinforced fibers, in a case of the present invention, indicating that the thermoplastic resin is reinforced with using the reinforced fibers having a fiber length of 3 to 25 mm.

The inventors assumed that even with using the thermoplastic resin having a low melt flow rate (melt viscosity) of 500 to 1,500 g/10 min with which the thermoplastic resin does not easily sufficiently penetrate an interior of the reinforced fiber bundles, when the twisting angle at the time of twisting the reinforced fiber bundles is adjusted, the reinforced fibers are not firmly converged. The inventors found that by twisting the reinforced fiber bundles such that the twisting angle θ is set to 0°<θ≤50°, the pellets containing the reinforced fibers at a high content rate can be produced with high productivity without deteriorating a mechanical property and an outer appearance of a molded article, and completed the present invention.

According to the method as described above, the pellets containing the reinforced fibers at a high content rate such as pellets containing 50 to 90 wt % of the reinforced fibers can be easily produced. The strand can be pultruded at high production speed of 60 to 80 m/min with respect to the pultruding direction.

It should be noted that preferably, the thermoplastic resin is a polypropylene resin, and the reinforced fiber bundles are glass rovings.

Effects of the Invention

According to the method for producing the long fiber reinforced thermoplastic resin pellets of the present invention, although the pellets containing the reinforced fibers at a high content rate can be produced with high productivity, and the reinforced fibers can be also easily untwisted at the time of melting the pellets to uniformly disperse the reinforced fibers in the molded article, and the mechanical property and the outer appearance of the molded article are not deteriorated.

BRIEF DESCRIPTION OF THE DRAWINGS

FIG. 4 A correlation diagram of a melt flow rate and the twisting angle of reinforced fibers.

MODES FOR CARRYING OUT THE INVENTION

Hereinafter, a method for producing long fiber reinforced thermoplastic resin pellets 1 according to the present invention will be described in detail based on the drawings. Firstly, a pellet production device 2 used in the method for producing of the long fiber reinforced thermoplastic resin pellets 1 will be described.

Figure 1:
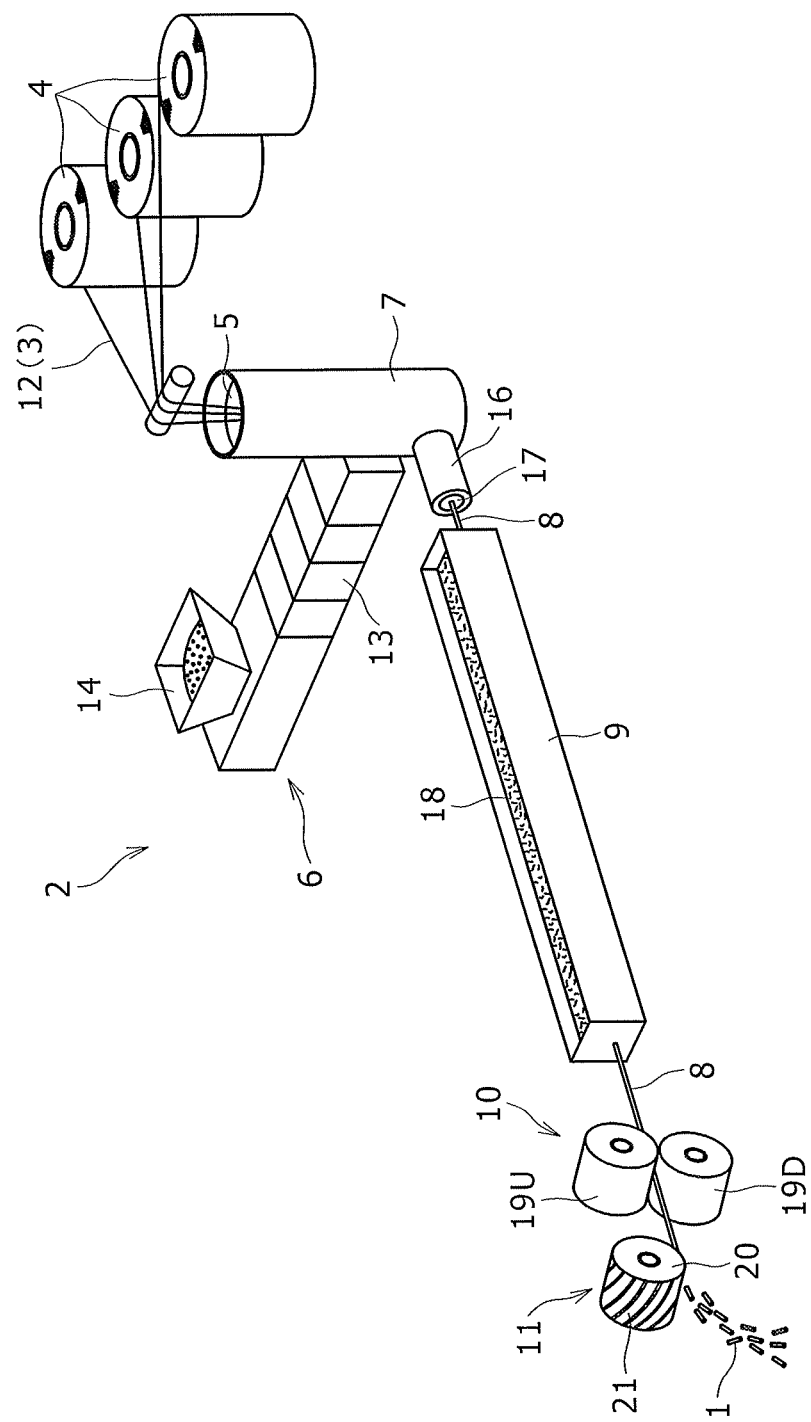
FIG. 1 A perspective view of a production device used in a method for producing of the present invention.

As shown in FIG. 1, the pellet production device 2 is provided with a plurality of coils 4 formed by winding reinforced fiber bundles 3, a mixer/extruder 6 for mixing and melting a thermoplastic resin serving as a material (hereinafter, referred to as the resin 5), and a resin impregnation head 7 for coating the reinforced fiber bundles 3 fed out from the coils 4 with the resin 5 plasticized by the mixer/extruder 6. The pellet production device 2 is also provided with a cooling device 9 for cooling the reinforced fiber bundles 3 (a strand 8) coated with the resin 5 in the resin impregnation head 7, a take-up device 10 arranged on the downstream side of the cooling device 9 for taking up the strand 8, and a cutter 11 for cutting the cooled strand 8 to a predetermined length.

The coils 4 are formed by winding wires of the reinforced fiber bundles 3. As reinforced fibers, an organic synthetic resin such as glass fiber, carbon fiber, and aramid, or metal fibers such as steel wires can be used. In the present embodiment, glass rovings 12 are used as the reinforced fiber bundles 3. The glass rovings 12 are formed by gathering a plurality of glass monofilaments having a diameter of 4 to 30 μm such that a roving count is 1,000 to 4,000 tex and winding the glass monofilaments into a cylindrical shape. Three glass rovings 12 are provided in the present embodiment.

In the mixer/extruder 6, a screw shaft (not shown) provided with mixing blades is rotatably provided in a chamber 13 whose interior is hollow, and a material of the resin 5 loaded from a hopper 14 is melted and plasticized. The plasticized resin 5 is fed to the resin impregnation head 7.

An example of the resin 5 supplied to the mixer/extruder 6 (the resin 5 coated over the reinforced fibers) includes a polyolefin resin such as polypropylene and polyethylene, a polyester resin such as polyethylene terephthalate and polybutylene terephthalate, a polyamide resin such as nylon, a polycarbonate resin, polyacetal, or a thermoplastic resin such as polyphenylene sulfide. In the present embodiment, a polypropylene resin is used.

A silane coupling agent (an adhesiveness improver for the reinforced fibers), a reactive diluent (an additive for improving a mechanical property of the pellets such as shock resistance), an antioxidant, a ultraviolet absorber, a light stabilizer, a flame retardant, a filler, a coloring pigment, or the like can be appropriately added to the resin 5.

The resin impregnation head 7 is formed into a cylindrical shape about an axis along the up and down direction, and the resin 5 plasticized by the mixer/extruder 6 is stored in a hollow interior thereof. An upper end of the resin impregnation head 7 is opened upward, and the reinforced fiber bundles 3 can be drawn into the stored resin 5 from this opening. In the interior of the resin impregnation head 7, a plurality of (five in the present embodiment) impregnation rolls (not shown) is provided at intervals in the up and down direction, and a structure is that the reinforced fiber bundles 3 drawn from the opening of the upper end are untwisted while successively passing through these impregnation rolls and the plasticized resin 5 is impregnated into the interior. On the lower end side of the resin impregnation head 7, an outlet 16 for pultruding the reinforced fiber bundles 3 impregnated with the resin 5 to an exterior is formed. A die 17 for shaping the resin 5 over the reinforced fibers to form the strand 8 is provided in this outlet 16.

The cooling device 9 is to cool the strand 8 pultruded from the resin impregnation head 7, arranged on the downstream side of the resin impregnation head 7. The cooling device 9 is a water tank, in an interior of which cooling water 18 is stored, capable of guiding and cooling the plasticized resin 5 coated over a surface of the strand 8 into the cooling water 18. The strand 8 cooled in the cooling device 9 is fed to the take-up device 10.

The take-up device 10 has a pair of upper and lower take-up rolls 19U, 19D in contact with each other on outer peripheral surfaces. The pair of upper and lower take-up rolls 19U, 19D is rotated in the rotation directions different from each other to nip and feed out the strand 8 to the downstream side.

Figure 2:
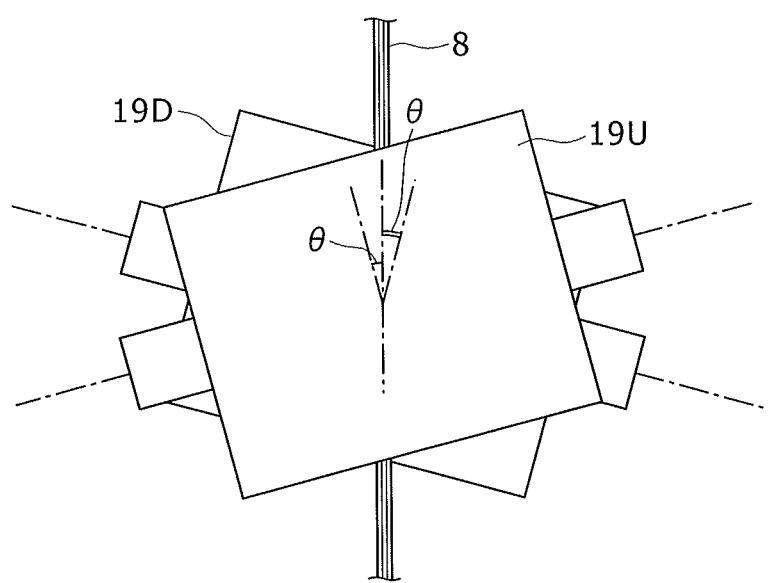
FIG. 2 An enlarged plan view of a take-up device.

As shown in FIG. 2, the pair of upper and lower take-up rolls 19U, 19D is arranged so as to be inclined with respect to the pultruding direction of the strand 8, and the upper and lower take-up rolls 19U, 19D are placed in the directions different from each other at an equal angle to each other. That is, in a case where the upper take-up roll 19U is inclined anticlockwise with respect to the pultruding direction when seen from the upper side by an inclination angle θ, the lower take-up roll 19D is inclined clockwise with respect to the pultruding direction by the inclination angle θ. Therefore, when the strand 8 is nipped between the take-up rolls 19, force in the twisting direction about an axis is added to the strand 8, so that the strand 8 is twisted by a twisting angle θ corresponding to the inclination angle θ of the take-up rolls 19.

Since the entire strand 8 on the downstream side of the lowest impregnation roll arranged in the interior of the resin impregnation head 7 is twisted by the take-up rolls 19, the reinforced fiber bundles 3 passing through the lowest impregnation roll are also twisted until passing through the die 17. As a result, in the strand 8 pultruded from the die 17, the reinforced fibers twisted in the resin impregnation head 7 are coated with the thermoplastic resin 5.

The cutter 11 is arranged on the downstream side of the take-up device 10, so as to cut the strand 8 cooled in the cooling device 9 to a predetermined length (for example, 3 to 10 mm). The cutter 11 is provided with a plurality of blade portions 21 inclined with respect to the direction of tangent at predetermined intervals in the circumferential direction on an outer peripheral surface of a cylindrical main body 20 rotated about an axis. Therefore, when the cutter 11 is rotated while abutting the strand 8 with the blade portions 21, the strand 8 is cut by the cutter 11 to a predetermined length in accordance with the intervals of the blade portions 21.

The pellets 1 obtained in such a way are melted before injection molding and appropriately diluted by the diluting resin 5 when necessary, so as to be used as a master batch for injection molding.

The method for producing of the present invention is characterized by pultruding the strand 8 under conditions that melt viscosity of the resin 5 is adjusted such that a melt flow rate is 500 to 1,500 g/10 min, and the twisting angle θ of the reinforced fiber bundles 3 with respect to the pultruding direction of the strand 8 is set to $0°<θ≤50°$.

The melt flow rate (the melt viscosity of the resin 5) is an indicator showing a flow property of the plasticized resin 5, regulated by JISK 7210 (a melt mass-flow rate of plastics-thermoplastics).

In the method for producing of the present invention, the resin 5 is adjusted such that the melt flow rate is 500 to 1,500 g/10 min. When the melt flow rate is less than 500 g/10 min, the flow property of the resin 5 is deteriorated, so that the resin 5 does not easily penetrate an interior of the reinforced fiber bundles 3. Meanwhile, when the melt flow rate exceeds 1,500 g/10 min, the viscosity of the resin 5 is too low, so that the resin 5 is not easily attached to (coated over) the reinforced fibers.

This melt flow rate of the resin 5 is set to a high range as a value of the resin 5 used for the long fiber reinforced thermoplastic resin pellets 1, and a low range as the melt viscosity of the resin 5 coated over surfaces of the reinforced fibers.

When the resin 5 having low melt viscosity is used in such a way, the resin does not easily sufficiently penetrate the interior of the twisted reinforced fiber bundles 3. Thus, the strand 8 is cooled while a part which is not impregnated with the resin 5 is left in the interior of the reinforced fiber bundles 3. As a result, the part which is not impregnated with the resin 5 is left in an interior of the pellets 1 as a clearance. Then, when the pellets 1 are melted, bubbles are easily generated in the molten resin 5, so that there is a problem that a defect in an outer appearance is easily caused in a molded article.

Thus, in the present invention, the strand 8 is pultruded not only under the condition that the melt flow rate of the resin 5 is adjusted to 500 to 1,500 g/10 min but also under the condition that the twisting angle θ of the reinforced fiber bundles 3 with respect to the pultruding direction of the strand 8 is set to $0°<θ≤50°$ as described above, preferably $10°<θ≤40°$.

The twisting angle θ of the reinforced fiber bundles 3 with respect to the pultruding direction of the strand 8 is adjusted in such a way for the following reason.

Figure 3A:
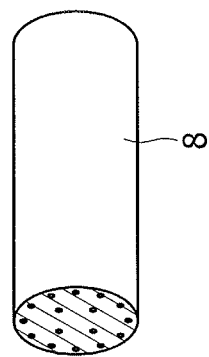
FIG. 3 Front views and sectional views of a strand in a case where a twisting angle is changed.
Figure 3B:
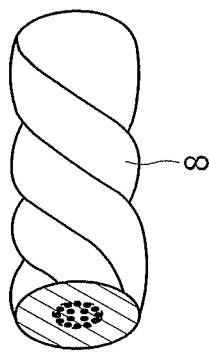
Figure 3C:
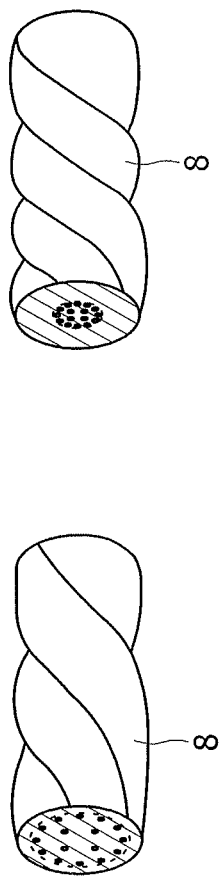

That is, when the twisting angle θ of the reinforced fiber bundles 3 is 0° as shown in FIG. 3(c), the reinforced fibers are not twisted. Thus, the reinforced fibers are aligned in parallel along the pultruding direction of the strand 8. As a result, the reinforced fibers also exist in the vicinity of the surface of the strand 8 as shown in a sectional view of FIG. 3(f). Thus, when the strand 8 is pultruded from the die 17, the reinforced fibers in the vicinity of the surface get stuck with the die 17, so that pultruding resistance of the strand 8 is increased. As a result, when production speed of the pellets 1 is increased, fracture of the strand 8 is easily generated, so that the pellets cannot be stably produced while increasing the production speed.

Figure 3D:
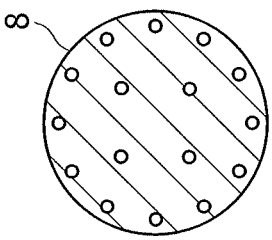

However, when the twisting angle θ of the reinforced fiber bundles 3 is 0° to 50° as shown in FIG. 3(a), preferably 10° to 40°, the reinforced fibers are twisted. Thus, the reinforced fibers are easily gathered in the interior of the strand 8. As a result, as shown in FIG. 3(d), when the strand 8 is pultruded from the die 17, the resin 5 coated over the reinforced fiber bundles 3 plays a role of lubrication and helps pultruding of the strand 8. Thus, the pultruding resistance of the strand 8 is decreased, so that the production speed of the pellets 1 can be increased. Since the reinforced fibers are gathered in the interior of the strand 8, the reinforced fibers are not easily abutted with the die 17, so that the fracture of the strand 8 is not caused.

Figure 3E:
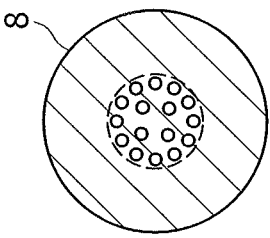
Figure 3F:
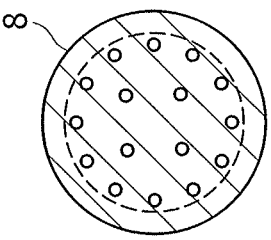

Meanwhile, when the twisting angle θ of the reinforced fiber bundles 3 is more than 50° as shown in FIG. 3(b), the reinforced fibers are strongly twisted. As a result, as shown in FIG. 3(e), the reinforced fibers are strongly tightened and gathered in the interior of the strand 8 in a firmly converged state. Thus, when the pellets 1 are melted, the reinforced fibers are not easily untwisted and dispersed from the pellets 1. As a result, the reinforced fibers are not properly dispersed in the molded article, and hence a mechanical property of the molded article is lowered.

Therefore, when the twisting angle θ of the reinforced fiber bundles 3 with respect to the pultruding direction of the strand 8 is $0°<θ≤50°$, preferably $10°≤θ≤40°$, the reinforced fibers can be prevented from being excessively firmly tightened in the interior of the strand 8 while maintaining a lubrication effect of the resin 5 coated over the reinforced fibers. In such a way, when the pellets 1 are melted, the reinforced fibers can be favorably dispersed in the master batch. Even when pultruding speed of the strand 8 is increased to 60 to 80 m/min with respect to the pultruding direction, breakage of the strand 8 is not caused, so that the pellets 1 can be stably produced.

Further, in the pellets 1 produced in such a way, the reinforced fibers are twisted so as to be gathered in the interior of the strand 8. Thus, more reinforced fibers can be distributed in the resin 5 in comparison to a case where the reinforced fibers are not twisted. As a result, even the pellets 1 containing the reinforced fibers at a high content rate of 50 to 90 wt % can be stably produced.

EXAMPLES

Next, the method for producing the long fiber reinforced thermoplastic resin pellets 1 of the present invention will be described with using Examples and Comparative Examples.

Examples and Comparative Examples were implemented by evaluating the long fiber reinforced thermoplastic resin pellets 1 produced as below with predetermined evaluation items.

Regarding production of the pellets 1, two to three coils 4 of the glass rovings 12 (roving count: 2,310 tex) formed by gathering monofilaments having a diameter of 17 μm (specific gravity: 2.5 g/cm³) are prepared, and the glass rovings 12 are supplied from these coils 4 to the resin impregnation head 7. It should be noted that the pellets 1 having a fiber content rate of 55 wt % are produced in a case of two coils 4, and the pellets 1 having a fiber content rate of 69 wt % are produced in a case of three coils 4. The resin 5 plasticized in the mixer/extruder 6 was supplied to the resin impregnation head 7. This resin 5 is polypropylene (PP) having specific gravity of 0.9 g/cm³. After impregnating the glass rovings 12 with the resin 5 of the resin impregnation head 7, the strand 8 was pultruded from an opening of the die 17 having an opening diameter of 3.0 mm at pultruding speed of 60 to 80 m/min, so that the strand 8 having a diameter of 3.0 mm was obtained. Then, the strand 8 was cut to 5 mm, so that the pellets 1 were produced.

It should be noted that the pellets 1 of Examples are formed by coating the glass monofilaments twisted so as to have the twisting angle θ of 0°, 10°, 40°, 50° with the resin 5 adjusted such that the melt flow rate is 500 g/10 min, 800 g/10 min, 1,500 g/10 min.

The pellets 1 of Comparative Examples are formed by using the resin 5 adjusted such that the melt flow rate is 300 g/10 min and twisting so as to have the twisting angle θ of 15°, or using the resin 5 adjusted such that the melt flow rate is 800 g/10 min and twisting so as to have the twisting angle θ of 5° or 60°.

The pellets 1 of Examples and Comparative Examples obtained as above were evaluated in accordance with the following evaluation items.

Operation stability: whether or not a stably continuous operation is able to be performed at the pultruding speed of 60 to 80 m/min was determined based on whether or not there is fuzz generated upon the glass monofilaments in stuck with the die, slippage of the strand 8 in the take-up device 10, or the breakage of the strand 8. Evaluation results are indicated by three types of rating symbols of ○, x, and Δ. The symbol x indicates a case where the breakage of the strand 8 was generated, the symbol Δ indicates a case where the fuzz was generated in the die or the slippage of the strand 8 was generated in the take-up device 10, and the symbol ○ indicates other cases (a case where the stably continuous operation was able to be performed at predetermined speed).

Impregnation property of resin into reinforced fibers: the impregnation property was determined based on whether or not the glass monofilaments which are not impregnated with the resin 5 are detached from the pellets 1. Evaluation results are indicated by two types of rating symbols of ○ and x. The symbol x indicates a case where detachment of the glass monofilaments which were not impregnated with the resin was confirmed, and the symbol ○ indicates a case where the detachment was not confirmed.

Outer appearance of molded article: the outer appearance was determined based on whether or not the still-converged glass monofilaments not being dispersed in the pellets 1 are confirmed. Evaluation results are indicated by two types of rating symbols of ○ and x. The symbol x indicates a case where the still-converged glass monofilaments were confirmed in the pellets 1, and the symbol ○ indicates a case where the glass monofilaments were not confirmed.

The evaluation results are shown in Table 1.

|  | No. of roving (fiber content rate) | Melt flow rate (g/10 min) | Strand twisting angle (°) | Strand pultruding speed (m/min) | Operation stability | Resin impregnation property into reinforced fibers | Outer appearance of molded article |
|---|---|---|---|---|---|---|---|
| Ex. 1 | 3 (68) | 500 | 10 | 80 | ○ | ○ | ○ |
| Ex. 2 | 3 (68) | 500 | 20 | 80 | ○ | ○ | ○ |
| Ex. 3 | 3 (68) | 800 | 20 | 60 | ○ | ○ | ○ |
| Ex. 4 | 3 (68) | 1,500 | 50 | 60 | ○ | ○ | ○ |
| Ex. 5 | 2 (55) | 1,500 | 20 | 80 | ○ | ○ | ○ |
| Com. Ex. 1 | 3 (68) | 300 | 15 | 80 | Δ | x | x |
| Com. Ex. 2 | 3 (68) | 800 | 5 | 40 | x (breakage) | x | x |
| Com. Ex. 3 | 3 (68) | 800 | 60 | 80 | ○ | ○ | x |

Seeing the results of Table 1, in Comparative Example 1 in which the resin 5 adjusted such that the melt flow rate is 300 g/10 min which is smaller than 500 g/10 min was used, since the detachment of the glass monofilaments which were not impregnated with the resin was confirmed, the "impregnation property of resin into reinforced fibers" is not favorable. Since the still-converged glass monofilaments were confirmed in the pellets 1, it is found that the "outer appearance of molded article" is also inferior.

In Comparative Example 2 in which although the resin 5 adjusted such that the melt flow rate is 800 g/10 min within a range of 500 to 1,500 g/10 min was used, the glass rovings 12 having the strand twisting angle of 5° which is lower than 10° were coated, not only the "impregnation property of resin into reinforced fibers" and the "outer appearance of molded article" are not favorable but also the breakage of the strand 8 was generated, so that the "operation stability" is also inferior.

Further, in Comparative Example 3 in which the glass rovings 12 having the strand twisting angle of 60° which exceeds 50° were coated, although the "operation stability" and the "impregnation property of resin into reinforced fibers" are favorable, the still-converged glass monofilaments were confirmed in the pellets 1, so that the "outer appearance of molded article" is not favorable.

Relative to these Comparative Examples, in any of Examples 1 to 5 in which the glass rovings 12 twisted so as to have the twisting angle θ of 10 to 50° were coated with the resin 5 adjusted such that the melt flow rate is 500 to 1,500 g/10 min, it is found that the "operation stability", the "resin impregnation property into reinforced fibers", and the "outer appearance of molded article" are favorable.

Therefore, as shown in FIG. 4, when the production is performed such that the melt flow rate is 500 to 1,500 g/10 min and the twisting angle θ is within a preferable range of 10 to 50°, it is determined that even the pellets containing the reinforced fibers at a high content rate such as pellets containing 50 to 90 wt % of the reinforced fibers can be stably produced while uniformly dispersing the reinforced fibers in the molded article without deteriorating the mechanical property and the outer appearance of the molded article.

The present invention is not limited to the above embodiment but a shape, a structure, material, combination, or the like of each member can be appropriately changed within a range not changing the essence of the invention.

In the above embodiment, the two or three glass rovings 12 are exemplified. However, the number of the glass rovings 12 may be one, or four or more.

In the above embodiment, a polypropylene resin is exemplified as the resin 5. However, polyethylene, nylon, polyethylene terephthalate, polycarbonate, and the like can be used as the resin 5.

In the above embodiment, a case where the pellets 1 containing 50 to 90 wt % of the reinforced fibers are produced and a case where the strand 8 is pultruded at 80 to 100 m/min with respect to the pultruding direction are taken as examples. However, the method for producing of the present invention can also be used in a case where the pellets 1 only containing less than 50 wt % of the reinforced fibers are produced and a case where the strand 8 is pultruded at 80 m/min or less with respect to the pultruding direction.

The present invention is described in detail with reference to the particular embodiment. However, it is obvious to those skilled in the art that various modifications and corrections can be added without departing from the spirit and the scope of the present invention.

The present application is based on the Japanese patent application (Japanese Patent Application No. 2009-217032) applied on Sep. 18, 2009, and contents thereof are included herein as a reference.

INDUSTRIAL APPLICABILITY

The long fiber reinforced thermoplastic resin pellets of the present invention can be utilized as for example a molding material of a bumper and a body of an automobile.

| Explanation of Reference Numerals | |
|---|---|
| 1: | Pellet (long fiber reinforced thermoplastic resin pellet) |
| 2: | Pellet production device |
| 3: | Reinforced fiber bundle |
| 4: | Coil |
| 5: | Thermoplastic resin (resin) |
| 6: | Mixer/extruder |
| 7: | Resin impregnation head |

| Explanation of Reference Numerals | |
|---|---|
| 8: | Strand |
| 9: | Cooling device |
| 10: | Take-up device |
| 11: | Cutter |
| 12: | Glass roving |
| 13: | Chamber |
| 14: | Hopper |
| 16: | Outlet |
| 17: | Die |
| 18: | Cooling water |
| 19U: | Upper take-up roll |
| 19D: | Lower take-up roll |
| 20: | Main body |
| 21: | Blade portion |
| θ: | Twisting angle of reinforced fiber bundle (inclination angle of take-up roll) |

The invention claimed is:

1. A method for producing long fiber reinforced thermoplastic resin pellets, comprising:
pultruding a plurality of reinforced fiber bundles in a molten thermoplastic resin while twisting the reinforced fiber bundles to form a strand in which reinforced fibers are coated with the thermoplastic resin, wherein the strand is pultruded by 60 to 80 m/min with respect to the pultruding direction; and
cutting the strand to a predetermined length to obtain the pellets, wherein the strand is pultruded under conditions that melt viscosity of the thermoplastic resin is adjusted such that a melt flow rate is 500 to 1,500 g/10 min, and a twisting angle θ of the reinforced fiber bundles with respect to a pultruding direction of the strand is set to $0° < θ ≤ 50°$.

2. The method for producing the long fiber reinforced thermoplastic resin pellets according to claim 1, wherein 50 to 90 wt % of the reinforced fibers is contained in the pellets.

3. The method for producing the long fiber reinforced thermoplastic resin pellets according to claim 1, wherein the thermoplastic resin is a polypropylene resin, and the reinforced fiber bundles are glass rovings.

4. The method for producing the long fiber reinforced thermoplastic resin pellets according to claim 2, wherein the thermoplastic resin is a polypropylene resin, and the reinforced fiber bundles are glass rovings.

5. The method for producing the long fiber reinforced thermoplastic resin pellets according to claim 1, wherein the thermoplastic resin is a polypropylene resin, and the reinforced fiber bundles are glass rovings.

6. The method for producing the long fiber reinforced thermoplastic resin pellets according to claim 2, wherein the thermoplastic resin is a polypropylene resin, and the reinforced fiber bundles are glass rovings.

* * * * *